US006419059B1

United States Patent
Nobu et al.

(10) Patent No.: US 6,419,059 B1
(45) Date of Patent: Jul. 16, 2002

(54) LOCK-UP CONTROL FOR DEVICE TORQUE CONVERTER

(75) Inventors: Hisao Nobu, Fujisawa; Tatsuo Wakahara, Kawasaki, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/688,243

(22) Filed: Oct. 16, 2000

(30) Foreign Application Priority Data

Oct. 18, 1999 (JP) .......................................... 11-295441

(51) Int. Cl.[7] .............................................. F16H 61/14
(52) U.S. Cl. ...................................................... 192/3.3
(58) Field of Search ............................... 192/3.3, 3.58; 74/733.1

(56) References Cited

U.S. PATENT DOCUMENTS

| | | | | |
|---|---|---|---|---|
| 2,736,412 A | * | 2/1956 | Livezey | 192/3.3 X |
| 3,241,399 A | * | 3/1966 | Fisher et al. | 192/3.3 X |
| 4,051,932 A | * | 10/1977 | Arai et al. | 192/3.3 |
| 4,680,928 A | * | 7/1987 | Nishigawa et al. | 60/329 |
| 4,828,084 A | * | 5/1989 | Hasegawa et al. | 192/3.3 |
| 4,880,091 A | * | 11/1989 | Hasegawa et al. | 192/3.3 |

FOREIGN PATENT DOCUMENTS

| JP | 3-51575 | * | 3/1991 |
|---|---|---|---|
| JP | 5-79560 | | 3/1993 |

* cited by examiner

*Primary Examiner*—Rodney H. Bonck
(74) *Attorney, Agent, or Firm*—Foley & Lardner

(57) ABSTRACT

A lock-up control device controls a lock-up clutch in a torque converter. The lock-up clutch is engaged by supplying a lock-up control pressure. The torque converter transmits torque via oil in a torque converter chamber when the lock-up clutch is disengaged, and transmits torque directly when the lock-up clutch is engaged. In the lock-up state, the oil pressure in the torque converter chamber is decreased by discharging oil in the torque converter chamber. By providing a circuit which leads oil discharged from the torque converter chamber to a lubricating part of the transmission, the balance between the inflowing oil amount and outflowing oil amount is improved, and oil insufficiency is prevented.

4 Claims, 1 Drawing Sheet

LOCK-UP CONTROL FOR DEVICE TORQUE CONVERTER

FIELD OF THE INVENTION

The present invention relates to a lock-up control device of a torque converter used for an automatic transmission.

BACKGROUND OF THE INVENTION

A torque converter drives a turbine by oil stirred by an impeller, and transmits power by hydraulic power transmission. Although the torque converter increases torque and absorbs torque fluctuations, slip occurs between the impeller and turbine, so efficiency of the transmission decreases.

In a lock-up torque converter, the slip can be eliminated and efficiency of the transmission can be increased by locking the impeller and turbine by engaging a lock-up clutch in a running region where torque increase and absorption of torque fluctuation is unnecessary.

The torque converter disclosed by JP-A-H5-79560 published by the Japanese Patent Office in 1993 discloses a torque converter comprising a lock-up control chamber partitioned by a lock-up clutch piston from a converter chamber. When a lock-up control pressure is supplied to this lock-up control chamber, the lock-up clutch piston displaces so that the lock-up clutch is engaged, and the impeller and turbine are locked. This torque converter is a three circuit lock-up torque converter comprising an inlet circuit which supplies oil to the torque-converter chamber, an outlet circuit which discharges oil from the torque-converter chamber, and a lock-up control circuit which supplies lock-up control pressure to the lock-up control chamber.

SUMMARY OF THE INVENTION

In the three circuit lock-up torque converter, the pressure (converter pressure) in the converter chamber is decreased by making the torque converter outlet circuit communicate with the drain port during lock-up, and the lock up control pressure can thereby be decreased.

However, if the torque converter outlet circuit is merely made to communicate with the drain port to decrease the converter pressure, oil balance (balance between the inflowing oil amount and outflowing oil amount) is impaired, and in particular when the pump is driven with the minimum necessary discharge amount to improve fuel cost performance, it may occur that oil is insufficient.

It is therefore an object of this invention to make effective use of the oil pressure discharged from a torque converter to decrease the converter pressure, and to prevent impairment of oil balance.

It is a further object of this invention to prevent seizure of an automatic transmission even under low temperature conditions when oil does not flow easily to an oil cooler for cooling during non lock-up periods.

It is yet a further object of this invention to prevent variation of pressure in the converter chamber during lock-up, and prevent a shock due to variation of the engaging force of a lock-up clutch.

In order to achieve above object, this invention provides a lock-up control device for controlling a lock-up clutch in a torque converter, the lock-up clutch being engaged by supplying a lock-up control pressure, and the torque converter transmitting torque via a fluid in a torque converter chamber when the lock-up clutch is disengaged and transmitting torque directly when the lock-up clutch is engaged.

The lock-up control device decreases the fluid pressure in the torque converter chamber by discharging fluid in the torque converter chamber during lock-up, and leads the fluid discharged from the torque converter chamber to a lubricating part of the transmission.

According to an aspect of the invention, this invention provides a lock-up control device for controlling a lock-up clutch in a torque converter, the lock-up clutch being engaged by supplying a lock-up control pressure, the torque converter transmitting torque via a fluid in a torque converter chamber when the lock-up clutch is disengaged and transmitting torque directly when the lock-up clutch is engaged. The lock-up control device comprises a fluid circuit which decreases the flow pressure in the torque converter chamber by discharging fluid in the converter chamber during lock-up, and a lubricating circuit which leads the fluid discharged from the torque converter chamber to a lubricating part of the transmission.

The details as well as other features and advantages of this invention are set forth in the remainder of the specification and are shown in the accompanying drawings.

DESCRIPTION OF THE PREFERRED EMBODIMENTS

Figure 1:
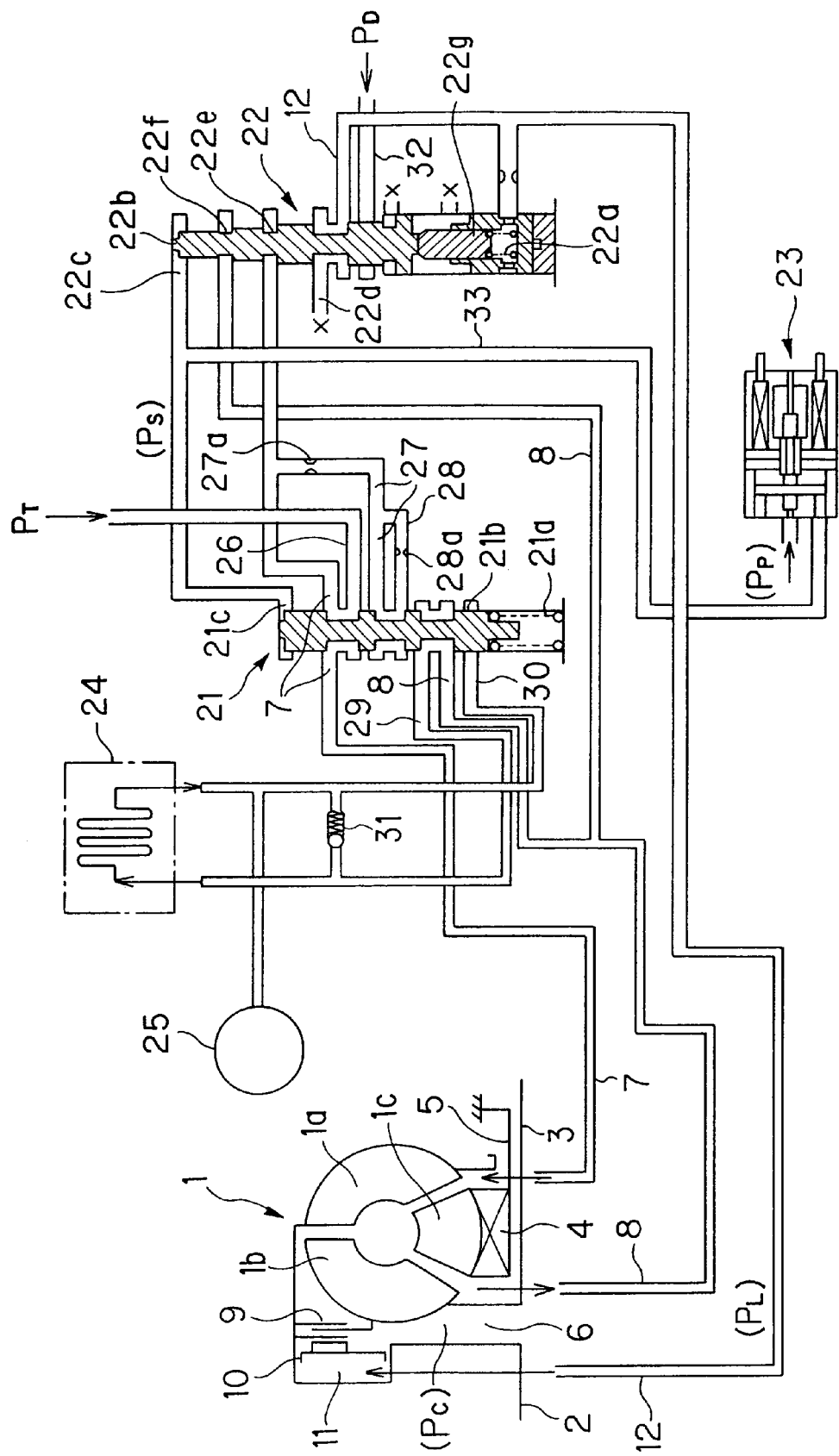
FIG. 1 shows an oil pressure circuit of a lock-up controller of torque converter according to this invention.

Referring to FIG. 1 of the drawing, a three circuit lock-up torque converter 1 comprises an impeller 1a, a turbine 1b disposed facing the impeller 1a, and a stator 1c. The impeller 1a is joined to a crankshaft 2 of an engine, not shown, and the turbine 1b is joined to an input shaft 3 of the automatic transmission, not shown. The stator 1c is disposed on a fixed shaft 5 via a one-way clutch 4 so that it cannot rotate in the opposite direction to the rotation direction of the engine. The stator 1c functions as a reactor.

Oil is supplied from a torque converter inlet circuit 7 to a converter chamber 6 housing the impeller 1a, turbine 2b and stator 1c, and the supplied oil is discharged to a torque converter outlet circuit 8. The oil in the converter chamber 6 is stirred by the impeller 1a driven by the engine, and after it impacts the turbine 1b, it is guided by the stator 1c to be returned to the impeller 1a. In this way, the turbine 1b is rotated while increasing the torque.

The torque converter 1 is further provided with a lock-up clutch 9 to lock the impeller 1a and turbine 1b. When a lock-up clutch piston 10 displaces, the lock-up clutch 9 is engaged, and the impeller 1a and turbine 1b are locked.

The lock-up clutch piston 10 partitions a lock-up control chamber 11 which is partitioned from the converter chamber 6. The lock-up clutch piston 10 displaces due to a force in the right-hand direction of the figure according to a differential pressure between a lock-up control pressure $P_L$ supplied to the lock-up control chamber 11 from the lock-up control circuit 12, and a converter pressure $P_C$ inside the converter chamber 6, engages the lock-up clutch 9, and locks the impeller 1a and turbine 1b.

Next, the oil pressure circuit of the lock-up controller will be described.

The oil pressure circuit comprises a torque converter control valve 21, lock-up control valve 22, lock-up solenoid 23 and oil cooler 24. A lubricating part 25 is a lubricating part of the automatic transmission.

The torque converter control valve 21 supplies oil to the converter chamber 6 of the torque converter 1, and controls recirculation of oil to the oil cooler 24 and lubricating part 25. A spool 21b is maintained in the normal position shown in the figure by a spring 21a. When a signal pressure $P_S$ is supplied to the chamber 21c, the spool 21b is pushed down from the normal position to a working position against the spring 21a.

When the spool 21b is in the normal position, the torque converter control valve 21 causes an input circuit 26 to which a torque converter working pressure $P_T$ is supplied, to communicate with the torque converter inlet circuit 7, causes parallel circuits 27, 28 to communicate with each other, and causes the torque converter outlet circuit 8 to communicate with an oil cooler circuit 29 which connects to the inlet of the oil cooler 24. Orifices 27a, 28a are respectively interposed in parallel circuits 27a, 28a. The circuit 28 is connected to the circuit 27 at a position nearer the torque converter control valve 21 than the orifice 27a, and the circuit 27 is connected to the torque converter inlet circuit 7.

The spool 21b is pushed down from the position shown in the figure, and when it is in the working position, the torque converter control 21 causes the input circuit 26 to communicate with the circuit 27, causes the circuit 28 to communicate with the oil cooler circuit 29, and causes the torque converter outlet circuit 8 to communicate with a lubricating circuit 30 which connects to the lubricating part 25. An outlet of the oil cooler 24 is connected to the lubricating circuit 30, and oil which has flowed through the oil cooler 24 is supplied from the oil cooler circuit 29 to the lubricating part 25.

Here, a bypass valve 31 is provided between the oil cooler circuit 29 and lubricating circuit 30. The bypass valve 31 is a check valve which allows oil to flow from the circuit 29 to the circuit 30, but prevents flow in the reverse direction. The bypass valve 31 opens when the viscosity of the oil becomes high at low temperature, oil does not flow easily to the oil cooler 24, and the inlet pressure of the oil cooler 24 increases above a predetermined value. Oil which has been stopped by the oil cooler 24 then returns to an oil pan via the lubricating part 25. By providing the bypass valve 31, seizure of the automatic transmission due to decrease of oil flowing to the lubricating part 25 is prevented even when the viscosity of the oil becomes high at low temperature.

Here, the opening pressure of the bypass valve 31 is determined as follows.

The decrease of oil flow to the oil cooler 24 due to the high viscosity of the oil, and seizure of the automatic transmission, occur when the oil is at low temperature. Therefore, at the temperature after warm-up when this problem does not occur, the above effect is achieved even if the bypass valve 31 is permanently closed.

However, if it is made possible to open the bypass valve 31 even at the temperature after warm-up, the bypass valve 31 can be opened and closed during lock-up at the temperature after warm up. If the bypass valve 31 is opened and closed during lock-up, the converter pressure $P_C$ of the converter chamber 6 varies via the circuit 29, and the engaging force of the lock-up clutch 9 varies so that a shock occurs.

Therefore, the bypass valve 31 is arranged not to open at the temperature after warm-up (e.g., over 40° C.) when lock-up is performed. Specifically, the set load of an internal spring which determines the opening pressure of the bypass valve 31 is set to a value at which the bypass valve 31 does not open due to the pressure generated at the inlet of the oil cooler 24 at the temperature at which lock-up is performed.

The lock-up control valve 22 performs lock-up control as to whether or not to perform lock-up of the torque converter 1 by supplying the lock-up control pressure $P_L$ to the lock-up control chamber 11, and controls the lock-up control pressure $P_L$ during lock up control. The spool 22b is supported in the normal position shown in the figure by the spring 22a. When the signal pressure $P_S$ is supplied to the chamber 22c, the spool 22b is pushed down from the normal position against the spring 22a and displaces to a working position.

When the spool 22b is in the normal position, the lock-up control valve 22 causes the lock-up control circuit 12 to communicate with the drain port 22d, eliminate the lock-up control pressure $P_L$, disengage the lock-up clutch 9, and place the torque converter 1 in the non-lock-up state.

When the spool 22b is pushed down from the normal position to the working position, the lock-up control valve 22 causes the lock-up control circuit 12 to communicate with the D-range pressure circuit 32 to which a D-range pressure $P_D$ generated when the selector lever of the automatic transmission is in a forward running range (D range) and the vehicle is moving forwards, is supplied. This D-range pressure $P_D$ is taken as a source pressure, the lock-up control pressure $P_L$ is output to the lock-up control circuit 12, and the torque converter 1 is placed in the lock-up state.

In the spool 22b, a torque converter inlet pressure in the torque converter inlet circuit 7 and the torque converter outlet pressure in the torque converter outlet circuit 8 are respectively made to act downwards in the figure on step parts 22e, 22f, and the lock-up control pressure $P_L$ which is fed back is made to act upwards in the figure on a plug 22g.

The spool 22b does not displace against the spring 22a due only to the torque converter inlet pressure and torque converter outlet pressure acting on the steps 22e, 22f, but due to these pressures and the lock-up control pressure $P_L$ which is fed back, the differential pressure between the lock-up control pressure $P_L$ which is the output pressure and the converter pressure $P_C$ in the converter chamber 6, i.e., the engaging force of the lock-up clutch 9, can be precisely controlled to a value depending on the signal pressure $P_S$ supplied to the chamber 22c even if the D-range pressure $P_D$, which is the source pressure, varies.

The signal pressure $P_S$ is controlled by the lock-up solenoid 23. The lock-up solenoid 23 is a linear solenoid, and outputs the signal pressure $P_S$ which is proportional to the supply current to a signal pressure circuit 33 taking a constant pilot pressure $P_P$ as a source pressure. The signal pressure circuit 33 is connected to the chamber 21c of the torque converter control valve 21 and the chamber 22c of the lock-up control valve 22.

The current supplied to the lock-up solenoid 23 is determined according to the lock-up control pressure $P_L$ required for the lock-up clutch piston 10 to push the lock-up clutch 9 in opposition to the converter pressure $P_C$ with a force at which the required engaging capacity of the lock-up clutch 9 is obtained.

Next, the action of this lock-up controller will be described.

When the torque converter 1 is not to be locked up, current is not supplied to the lock-up solenoid 23, and the signal pressure $P_S$ is not output to the circuit 33.

Therefore, the spool 21b of the torque converter control valve 21 is in the normal position shown in the figure, and the torque converter working pressure $P_T$ in the input circuit 26 is supplied to the converter chamber 6 of the torque converter 1 from the torque converter inlet circuit 7. The torque converter outlet circuit 8 is made to communicate with the oil cooler circuit 29, and after oil returning from the converter chamber 6 is cooled by the oil cooler 24, it is supplied for lubricating the lubricating part 25 and is drained to the oil pan.

When the signal pressure $P_S$ is not generated when lock-up should not be performed, the spool 22b of the lock-up control valve 22 is in the normal position shown in the figure, the lock-up control circuit 12 is made to communicate with the drain port 22d, and the lock-up control pressure $P_L$ is eliminated. Therefore, as the piston 10 does not engage the lock-up clutch 9, and the torque converter 1 performs power transmission in the non lock-up state.

When the torque converter 1 is to be engaged, current is supplied to the lock-up solenoid 23, and the signal pressure $P_S$ proportional to the current value is output to the circuit 33. The spool 21b of the torque control valve 21 is pushed down to the working position from the normal position, and the spool 22b of the lock-up control valve 22 is also pushed down to the working position from the normal position.

When the spool 21b of the torque converter control valve 21 displaces to the working position, the input circuit 26 is made to communicate with the circuit 27, the circuit 28 is made to communicate with the oil cooler circuit 29, and the torque converter output circuit 8 is made to communicate with the lubricating circuit 30.

As a result, the torque converter working pressure $P_T$ of the input circuit 26 is introduced to the circuit 27. On one hand, the torque converter working pressure $P_T$ to the circuit 27 is supplied to the converter chamber 6 of the torque converter 1 from the torque converter inlet circuit 7 via the orifice 27a. On the other hand, oil is supplied to the oil cooler 24 from the circuit 29 via the orifice 28a, and after cooling, it is supplied for lubrication of the lubricating part 25 and is drained off to the oil pan. Oil returning from the converter chamber 6 is supplied for lubrication of the lubricating part 25 via the lubricating circuit 30, and then flows down to the oil pan.

When the spool 22b displaces to the working position described above, the lock-up control valve 22 outputs the lock-up control pressure $P_L$ which is proportional to the signal pressure $P_S$, i.e., a current amount supplied to the lock-up solenoid 23, to the lock-up control circuit 12 taking the D-range pressure from the D-range pressure circuit 32 as a source pressure. Due to the lock-up control pressure $P_L$, the lock-up clutch piston 10 displaces, the lock-up clutch 9 is engaged by a force according to the lock-up control pressure $P_L$, and torque converter 1 enters the lock-up state.

The lock-up control pressure $P_L$ is determined as a value required to push the lock-up clutch piston 10 against the lock-up clutch 9 in opposition to the converter pressure $P_C$ with a force at which the required engaging capacity of the lock-up clutch 9 is obtained. The supply current to the lock-up solenoid 23 is determined corresponding to this lock-up control pressure $P_L$.

In this embodiment, as described above, during lock-up, oil returning from the converter chamber 6 to the circuit 8 is discharged to the oil pan via the lubricating circuit 30 and lubricating part 25 without passing through the oil cooler 24 which has a large resistance. Therefore, the converter pressure $P_C$ in the converter chamber 6 can be decreased, and the required engaging capacity of the lock-up clutch 9 can be achieved even if the lock-up control pressure $P_L$ is determined low by a corresponding amount. As the lock-up control pressure $P_L$ can be reduced, the stiffness of the torque converter 1 which must be designed to withstand this pressure can be suppressed low, and the capacity of the oil pump which supplies the oil can also be reduced. This is advantageous from the viewpoint of cost, reduces the drive load of the oil pump, and is largely beneficial from the viewpoint of fuel economy.

Moreover, when oil returning from the converter chamber 6 to the circuit 8 is discharged to the oil pan for this purpose, the discharged oil is led to the lubricating part 25 via the lubricating circuit 30, and is discharged to the oil pan after making effective use of it for lubricating the lubricating part 25, and impairment of oil balance between the inflowing oil amount and outflowing oil amount is prevented.

The bypass valve 31 is interposed between the oil cooler circuit 29 and lubricating circuit 30 so as to permit oil flow from the circuit 29 to the circuit 30, and prevent oil flow in reverse direction. As a result, when the viscosity of the oil increases at low temperature so that it does not flow easily to the oil cooler 24, and the inlet pressure of the oil cooler 24 increases above the valve opening pressure, the bypass valve 31 opens, and after oil which is stopped by the oil cooler 24 is directed to the lubricating part 25, it is returned to the oil pan.

Therefore, even if oil does not flow easily to the oil cooler 24 at low temperature and the oil amount flowing into the lubricating part 25 from the oil cooler 24 decreases, the required lubricating oil amount can be maintained by opening the bypass valve 31, and seizure of the automatic transmission due to poor lubrication can be prevented.

Further, the opening pressure of the bypass valve 31 is set so that the bypass valve 31 does not open at the oil cooler inlet pressure (pressure inside the oil cooler circuit 29) in the temperature at which lock-up is performed, so the bypass valve 31 can be maintained in the closed state during lock-up. Therefore, the pressure in the converter chamber 6 due to opening and closing of the bypass valve 31 does not vary during lock-up, the engaging force of the lock-up clutch 9 does not vary, and shocks due to the variation of the lock-up engaging force are prevented.

The temperature range at which the bypass valve 31 is maintained in the closed state is the temperature range at which lock-up is performed. In this temperature range, oil does not reach such a high viscosity that it does not pass through the oil cooler easily, so the aforesaid advantage due to provision of the bypass valve 31 is still obtained.

The entire contents of Japanese Patent Application P11-295441 (filed Oct. 18, 1999) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed is:

1. A lock-up control device for controlling a lock-up clutch in a torque converter, the lock-up clutch being engaged by supplying a lock-up control pressure, and the torque converter transmitting torque via a fluid in a torque converter chamber when the lock-up clutch is disengaged and transmitting torque directly when the lock-up clutch is engaged, wherein the lock-up control device decreases the fluid pressure in the torque converter chamber by discharging fluid in the torque converter chamber, and leads the fluid discharged from the torque converter chamber to a cooling device in a non-lock-up state, and the lock-up control device decreases the fluid pressure in the torque converter chamber by discharging fluid in the torque converter chamber, and leads the fluid discharged from the torque converter chamber to a lubricating part of the transmission in a lock-up state.

2. A lock-up control device for controlling a lock-up clutch in a torque converter, the lock-up clutch being engaged by supplying a lock-up control pressure, the torque converter transmitting torque via a fluid in a torque converter chamber when the lock-up clutch is disengaged and transmitting torque directly when the lock-up clutch is engaged, and the lock-up control device comprising:

a fluid circuit which decreases the flow pressure in the torque converter chamber by discharging fluid in the converter chamber, a lubricating circuit connected to a lubricating part of the transmission, a fluid cooling device, a cooling circuit connected to an inlet of the fluid cooling device, and a control valve which causes the fluid circuit to communicate with the cooling circuit to pass the fluid discharged from the torque converter chamber to the fluid cooling device when the lock-up clutch is disengaged, said control valve causing the fluid circuit to communicate with the lubricating circuit to pass the fluid discharged from the torque converter chamber to the lubricating part of the transmission when the lock-up clutch is engaged.

3. A lock-up control device as defined in claim 2, further comprising:

a bypass valve which opens according to a pressure of the cooling circuit, and allows the cooling circuit to communicate with the lubricating circuit.

4. A lock-up control device as defined in claim 3, wherein:

opening pressure of the bypass valve is set so the valve does not open at a pressure generated in the cooling circuit at a temperature at which lock-up is performed.

* * * * *